No. 621,547. Patented Mar. 21, 1899.
M. THONAR.
MACHINE FOR CUTTING STONE.
(Application filed Dec. 29, 1897.)

(No Model.)

Witnesses
Geo. S. Kennedy

Inventor
Michel Thonar
by W. A. Rosenbury
atty

UNITED STATES PATENT OFFICE.

MICHEL THONAR, OF NAMUR, BELGIUM.

MACHINE FOR CUTTING STONE.

SPECIFICATION forming part of Letters Patent No. 621,547, dated March 21, 1899.

Application filed December 29, 1897. Serial No. 664,261. (No model.)

*To all whom it may concern:*

Be it known that I, MICHEL THONAR, a subject of the King of Belgium, residing at Namur, in the Kingdom of Belgium, have invented certain new and useful Improvements in Machines for Cutting Stone, of which the following is a specification.

This invention was patented in France May 18, 1897, No. 267,066, and in Belgium May 18, 1897, No. 128,307.

This invention relates to an improvement in machines for cutting stone by aid of an endless wire, and more particularly to that class of machines in which the descent of the cutting-wire is caused only by the action of a stretcher inserted in said wire and which is always required in order to keep the wire taut.

In machines for cutting stone as heretofore employed it has been usual to cause the wire to pass over two fixed pulleys, between which is placed the rock or stone which is to be cut. The tension exerted by the stretcher tends to straighten the wire between the two fixed pulleys, and consequently causes its penetration into the rock. This arrangement is convenient only when the stone or rock to be cut is not of too great a height. Otherwise it is necessary in order to prevent the wire from acting under too sharp an angle upon the stone or rock to be cut to make use of suitable movable guide-pulleys, said movable pulleys being pressed down by means of mechanical devices, such as screws, helical wheels, &c.

My invention has for its object to prevent the wire from acting under too sharp an angle upon the rock to be cut, and thus prevent dangerous flexures of the cutting-wire, said wire being pressed down automatically without making use of screws, toothed wheels, or the like; and it consists, essentially, in the combination, with the two fixed pulleys placed at the base of the stone to be cut, hereinbefore referred to, of movable pulleys lifted by weights, which counteract the downward pull of the cutting-wire kept taut by the stretcher.

Figure 1:
Figure 2:
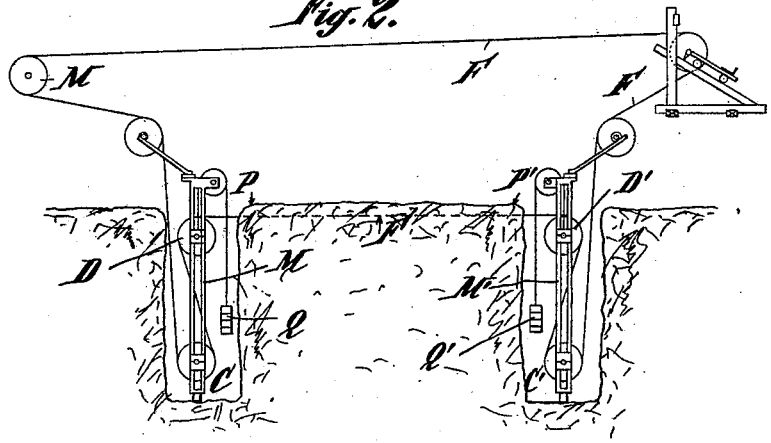
Figure 3:
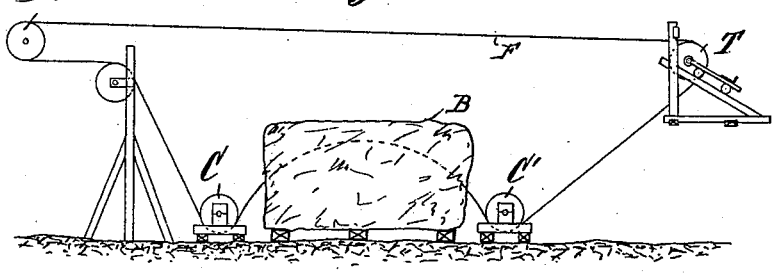
Figure 4:
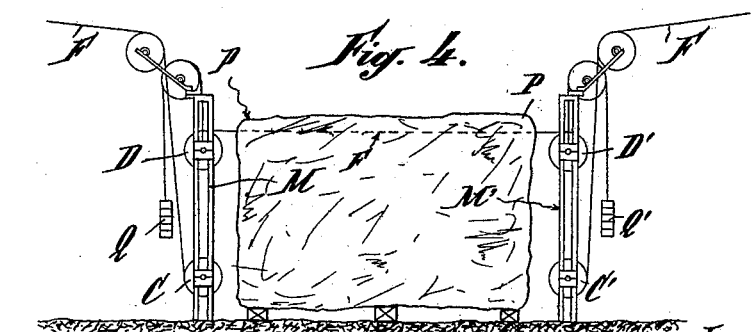

In the annexed drawings, Figures 1 and 3 represent the usual arrangement as heretofore employed. Figs. 2 and 4 illustrate my improved sawing-machine used for cutting slabs in a boss or block, Fig. 2, and for cutting a stone removed from the quarry, Fig. 4.

In Figs. 1 and 3 of the drawings, $c\ c'$ are the two fixed pulleys placed at the base of the block or boss B which is to be cut. F is the endless wire conducted under these pulleys and passed thence directly around the pulley of the usual stretcher, from which it returns to the actuating-pulley. According to my invention this arrangement is improved in the following manner: In order to avoid exaggerated and dangerous flexures of the wire between the points P P', I place on each side of the block two pulleys D D', Fig. 2, carried by posts M M'. The pulleys C C' have their bearings fixed in these posts, while the bearings of the axles of the pulleys D D' are movable along the posts and are lifted by counterweights Q Q', the weight of which is somewhat greater than that of the pulleys with their bearings, so that the tension exerted on the wire by the stretcher, tending to press the wire down and lower the pulleys D D', will be opposed by the counterweights Q lifting the pulleys D D', and thus allowing the wire to enter the rock without undergoing dangerous flexures. As shown in Fig. 4, the same arrangement may be used for cutting a stone removed from the quarry.

Having thus described my invention, I claim—

In a machine for cutting stone by the aid of an endless wire, the combination of the wire, a stretcher therefor, a post fixed on each side of the stone to be cut, a fixed pulley at the base of each post, movable pulleys above the fixed pulleys and adapted to slide in the posts, the wire passing over said fixed and movable pulleys and tending to pull the movable pulleys downward, and counterweights acting on the movable pulleys in opposition to the pull of the wire, substantially as described.

In testimony whereof I have signed this specification in the presence of two subscribing witnesses.

MICHEL THONAR.

Witnesses:
 GEORGE BEDE,
 GREGORY PHELAN.